United States Patent [19]

Brooks et al.

[11] Patent Number: 4,766,677
[45] Date of Patent: Aug. 30, 1988

[54] METHOD AND APPARATUS FOR VAPOR PHASE SOLDERING

[75] Inventors: Terrill W. Brooks; Donald R. Gerard, both of Bowling Green, Ky.

[73] Assignee: Detrex Chemical Industries, Inc., Southfield, Mich.

[21] Appl. No.: 867,816

[22] Filed: May 27, 1986

[51] Int. Cl.[4] ........................................... F26B 15/12
[52] U.S. Cl. ............................................. 34/78; 34/242
[58] Field of Search ................ 228/180.1; 34/77, 78, 34/242

[56] References Cited

U.S. PATENT DOCUMENTS

| | | |
|---|---|---|
| Re. 30,399 | 9/1980 | Ammann . |
| 872,257 | 11/1907 | Schicht . |
| 2,723,448 | 11/1955 | Miller . |
| 2,842,841 | 7/1958 | Schnable . |
| 2,844,867 | 7/1958 | Wernz . |
| 3,000,346 | 9/1961 | Hnilicka, Jr. . |
| 3,080,648 | 12/1963 | Thomas . |
| 3,263,325 | 8/1966 | Jacobson . |
| 3,375,177 | 3/1968 | Rand . |
| 3,408,748 | 11/1968 | Dunn, Jr. . |
| 3,409,978 | 12/1968 | Raciti . |
| 3,482,755 | 12/1969 | Raciti . |
| 3,656,492 | 4/1972 | Holm . |
| 3,686,746 | 8/1972 | Gwyn, Jr. . |
| 3,825,164 | 7/1974 | Sarnacki . |
| 3,866,307 | 2/1975 | Pfahl, Jr. . |
| 3,904,102 | 9/1975 | Chu . |
| 3,947,240 | 3/1976 | Pfahl, Jr. . |
| 3,977,075 | 8/1976 | Lynch . |
| 3,996,949 | 12/1976 | Boynton . |
| 4,032,033 | 6/1977 | Chu . |
| 4,055,217 | 8/1976 | Chu . |
| 4,077,467 | 3/1978 | Spigarelli . |
| 4,090,843 | 5/1978 | Chu . |
| 4,115,601 | 9/1978 | Ammann . |
| 4,146,166 | 3/1979 | Bankes . |
| 4,150,494 | 4/1979 | Rothchild ............................. 34/242 |
| 4,187,974 | 2/1980 | Mahajan . |
| 4,194,297 | 3/1980 | Pfahl, Jr. . |
| 4,234,118 | 4/1983 | Bankes . |
| 4,238,186 | 12/1980 | Pfahl, Jr. . |
| 4,244,505 | 1/1981 | Stokes, Jr. . |
| 4,256,512 | 3/1981 | Ammann . |
| 4,264,299 | 4/1981 | Ammann . |
| 4,277,518 | 7/1981 | Schillke . |
| 4,315,042 | 2/1982 | Spigarelli . |
| 4,348,174 | 9/1982 | Spigarelli . |
| 4,373,658 | 2/1983 | March . |
| 4,378,296 | 8/1983 | Carlson, Jr. . |
| 4,380,431 | 4/1983 | Carlson, Jr. . |
| 4,389,797 | 6/1983 | Spigarelli . |
| 4,403,949 | 9/1983 | March . |
| 4,538,363 | 9/1985 | Zagaroff ............................. 34/242 |

OTHER PUBLICATIONS

Product brochure, "Phase-Four Production Systems for Vapor Phase Soldering", HTC.
Product brochure, "Phase-Four Model IL-12", HTC, 1983.
Advertisement, "Facts you can use in your surface mount soldering", Hollis Automation, Inc., 1985.
Product brochure, "Mannix Vapor Phase & Infra-Red (List continued on next page.)

[57] ABSTRACT

A system is provided for vapor phase soldering of articles, in a hot vapor, in which the articles are preheated prior to being delivered to a vapor zone, to raise the temperature of the wires or other contact points that are to be soldered together, to be compatible. Techniques are employed to prevent escape of the soldering vapor, including controlled opening of inlet and outlet closures to the system, sloped inlet and outlet tunnels, heated inlet and outlet zones, the condensation of vapor at transition locations and an air screen or air shield system just inside the openable closures to the system. A control of the locations of condensation of the vapors is provided, with delivery of the condensate for re-use. A condensate flash tray is provided in the system for substantially immediate re-vaporization of some of the condensate. An electric fluid boil system and a still are provided. A conveying system is provided for delivering articles into, through and out of the vapor zone, from positions above the vapor line, through the vapor, and back above the vapor line upon discharge.

34 Claims, 4 Drawing Sheets

OTHER PUBLICATIONS

Reflow Soldering Systems", Henry Mann, Inc., 1984.
Product brochure, "SMT Vapor Soldering System—Model CUPSS-1", Centech Corp., 6/84.
"Vapor Phase Soldering", *Journal of Metals*, Jun. 1977, pp. 22 and 23.
"Condensation/Vapor-Phase Reflow Soldering", *Assembly Engineering*, Jun. 3, 1977, pp. 44–47.
"Hot Vapor Cures a Tough Solder Headache", *Automation*, Dec. 1976, pp. 5 and 6.
"Vapor Phase Fusion and Reflow for PC's", *PC Traces*, Apr. 1975, pp. 85 and 86.
"Vapor–Phase Reflow: Condensing Vapor Does the Trick—Quick", *Circuits Manufacturing*, Jun. 1975, p. 24.
"Vapor–Phase Process Insures Quality Control for Difficult Soldering Operations", *LEAD*, vol. 40, No. 1-2, 1977.
"Vapor Phase Solder Reflow for Hybrid Circuit Manufacturing", *Solid State Technology*, vol. 19, No. 10, pp. 50–53.
"Vapor Phase Solder Reflow", *Production Machines*, p. 58.
"Vapor Phase Solder Reflow", *California Circuit Association*, Oct. 1975.
Sales brochure, "Fluorinert Brand Electronic Liquids", 3M Company.
Dingman, "Solvent Vapor Solder Reflow", *IBM Technical Disclosure Bulletin*, vol. 13, No. 3, 8–1970, p. 639.
"Condensation Soldering: A New Mass Soldering Process", from The Western Electric Engineer, Apr. 1975.
"Condensation Soldering with Vapor Blanket Reduces Cost of This High Yield, High Quality Process", by T. Y. Chu et al.
"Residue Removal Methods for Condensation Soldering Systems", by P. F. Lilienthal, G. M. Wenger, F. M. Zado.
"Reprint from Electronic Packaging and Production", Jul. 1976, entitled Understanding Fluorocarbons, p. 78, by M. S. Kiver Publications.

*Primary Examiner*—Larry I. Schwartz
*Attorney, Agent, or Firm*—Panitch Schwarze Jacobs and Nadel

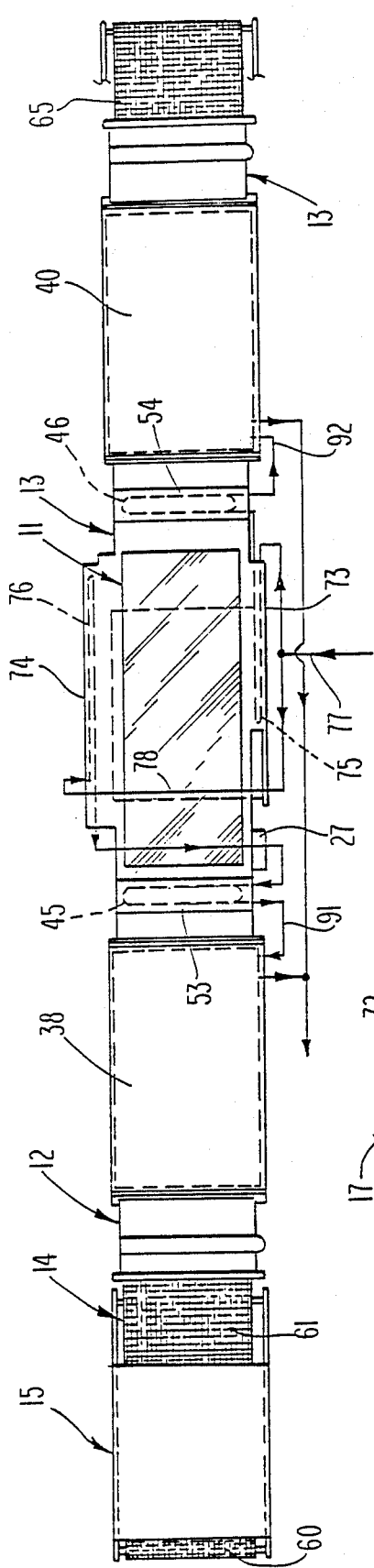
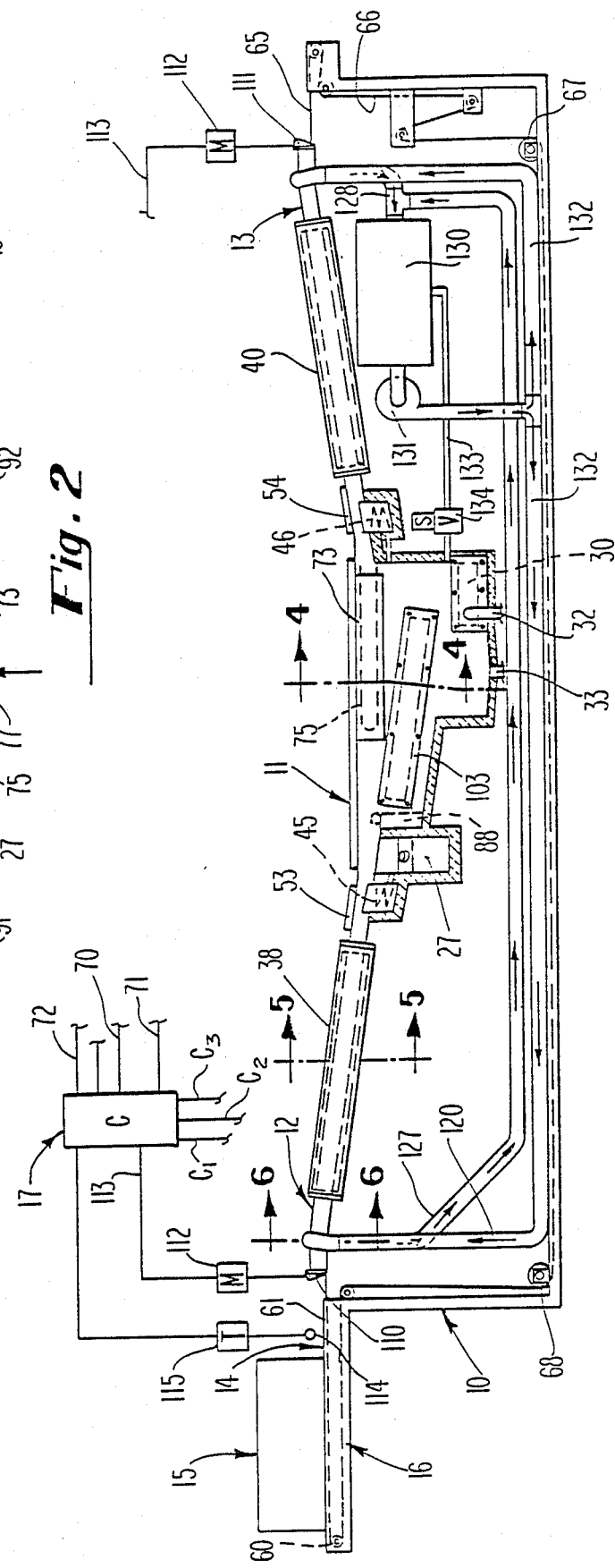
Fig. 2
Fig. 1

METHOD AND APPARATUS FOR VAPOR PHASE SOLDERING

FIELD OF THE INVENTION

The present invention relates broadly to apparatus and process for soldering items such as circuit boards having electronic components mounted thereon with metallic leads or other metallic contacts inserted through holes in the boards or applied to contact points on the boards preparatory to soldering. More specifically, this invention relates to improved apparatus and method for soldering circuit boards and the like in which the component leads or contacts to be soldered are preferably first deposited into a pasty flux on the board for holding the components in position on the board, and then the boards and components are heated to a soldering temperature by means of the heat of condensation of a hot, saturated vapor in a continuous process in which the circuit boards are conveyed through a hot solvent vapor by means of a moving belt or conveyor.

DESCRIPTION OF THE PRIOR ART

For many years the leads of electronic components have been soldered to circuit boards by direct application of heat by means of soldering irons or the like. However, it was recognized that such techniques were not satisfactory for large numbers of circuit boards, particularly if the circuit boards had many closely spaced leads to be soldered, which often was the case. Numerous processes were suggested to improve upon the conventional soldering iron techniques to provide a process which would be suitable for mass soldering of circuit boards. Thus, the patent to Wittman (U.S. Pat. No. 3,359,132) shows a process for soldering printed circuit boards in which a layer of peanut oil is floated on a molten solder bath. A circuit board having a flux coating is then suspended close to the surface of the hot peanut oil for a time sufficient to preheat the board, following which the board is lowered through the peanut oil layer into the underlying molten solder bath where the metallic leads are soldered. This process obviated the use of soldering irons but had limitations in mass soldering operations. About 1970, a new soldering process was disclosed in which the circuit board to be soldered was immersed in a body of hot vapor produced by processes previously used in the cleaning and degreasing of metal work objects. Vapor immersion processes of this type are disclosed in U.S. Pat. Nos. 3,866,387 and 3,904,102. However, in mass soldering these processes presented a problem of solvent loss which raised the cost substantially since the solvents used are expensive. Such solvent loss also resulted in pollution of the environment. One effort to reduce such solvent loss is shown in U.S. Pat. No. 4,389,797 in which entrance and exit conduits positioned entirely below the upper level of a body of solvent vapor are employed. Both of such conduits are cooled in an effort to keep the solvent vapor from escaping as the circuit boards are passed through the conduits. However, the potential entrainment of liquid solvent on the surface of the circuit boards and contaminants on such surfaces have presented problems in the use of such systems.

Other problems that exist in the art include undesirable moisture or humidity due to water in the vapor preventing the formation of good solder connections, vapor collapse by failure to maintain a desired vapor level thereby leading to poor solder connections, uncontrolled loss of heat due to incoming articles and the incoming conveyor providing a heat sink, undesirable fluid dragout, fogging of windows in apparatus, the undesirable formation of aerosols, the falling of condensate directly into boiling liquid whereby vapor temperature is reduced and a lag time is created in vapor generation, inability to maintain an oxygen-free environment, fluid loss at product inlet and exit locations, and the presence of hard-to-control secondary vapor zones in situations where a secondary vapor is used to overlie the primary vapor, to mention a number of such problems. Each of the prior art processes involve known disadvantages for use in commercial mass soldering and these disadvantages have limited the commercial use of these systems. The present invention is directed to overcoming these disadvantages.

The present invention is addressed to a vapor phase soldering method and apparatus in which a fluid is heated to create vapor zone, with the articles or product to be soldered being delivered into the vapor zone on a conveyor, and then delivered outwardly from the zone after the soldering operation, with the delivery to and from the vapor zone being through entrance and exit tunnels. Automatically operated covers seal the openings for the entrance and exit tunnels, to prevent fluid losses. The entrance and exit tunnels are heated to also help reduce fluid losses, and a hot air zone is maintained above the fluid vapor line. Hot zones at the tunnel/vapor zone junctions help drive out moisture, help preheat the product, and help reduce fogging. The accumulation of condensate is controlled, and delivered to the flash tray below the conveyor in the vapor zone, to input additional heat. The condensate is collected in such a way as to avoid undesirable dropping of droplets onto the product that is being, or is to be, soldered. The condensate is rapidly flashed back, at least in part, to a vapor state. The entrance and exit openings of each tunnel are provided with air curtains or shields, preferably of a recirculating closed or semi-closed type, for capturing any vapor and/or aerosols that would otherwise be discharged through the tunnel openings, and this air is then demisted for reclaimation of fluid therefrom. The invention comprises each of these features, alone or in various combinations.

One of the objects of this invention is to provide an improved soldering method and apparatus for quick and economical mass soldering operations, particularly for circuit board soldering.

Another object of this invention is to provide a high speed soldering operation for printed circuit boards which avoids heat damage to the boards as well as to sensitive electronic components mounted on such boards.

Another object of this invention is to provide a soldering method and apparatus for soldering printed circuit boards which minimizes loss of solvent vapor and solvent and removes contamination from the surface of the boards.

Further objects of this invention will be observed during the course of the following description and by reference to the accompanying drawings and claims.

In one preferred embodiment, the removal of contaminants and liquid solvent from the surface of circuit boards being soldered by vapor soldering systems is greatly enhanced by introducing the circuit boards from above the vapor line preferably at a downward angle through a heated conduit or tunnel, passing the circuit boards through the vapor zone and then passing the circuit boards upwardly through an inclined heated conduit on a conveyor which carries the circuit boards into, through and out of the vapor. The optimum entry and exit angles lie in the range from about 5° to about 10° measured from the horizontal established by the vapor line. This is particularly helpful when a large amount of flux has been used that must be vaporized from the boards and components, such as when the components have very small contacts to be soldered to very small contact points on the boards and wherein the pasty flux is used in sufficient quantity to hold the components to the boards prior to and during the soldering operation.

BRIEF DESCRIPTIONS OF THE DRAWING FIGURES

FIG. 1 is a longitudinal vertical sectional view, taken through the apparatus of this invention, partly in elevation, wherein the various functions of the apparatus are most completely illustrated, and with certain control features of the invention being schematically illustrated.

FIG. 2 is a top plan view of the apparatus of FIG. 1.

DETAILED DESCRIPTION OF THE PREFERRED EMBODIMENT

Figure 3:
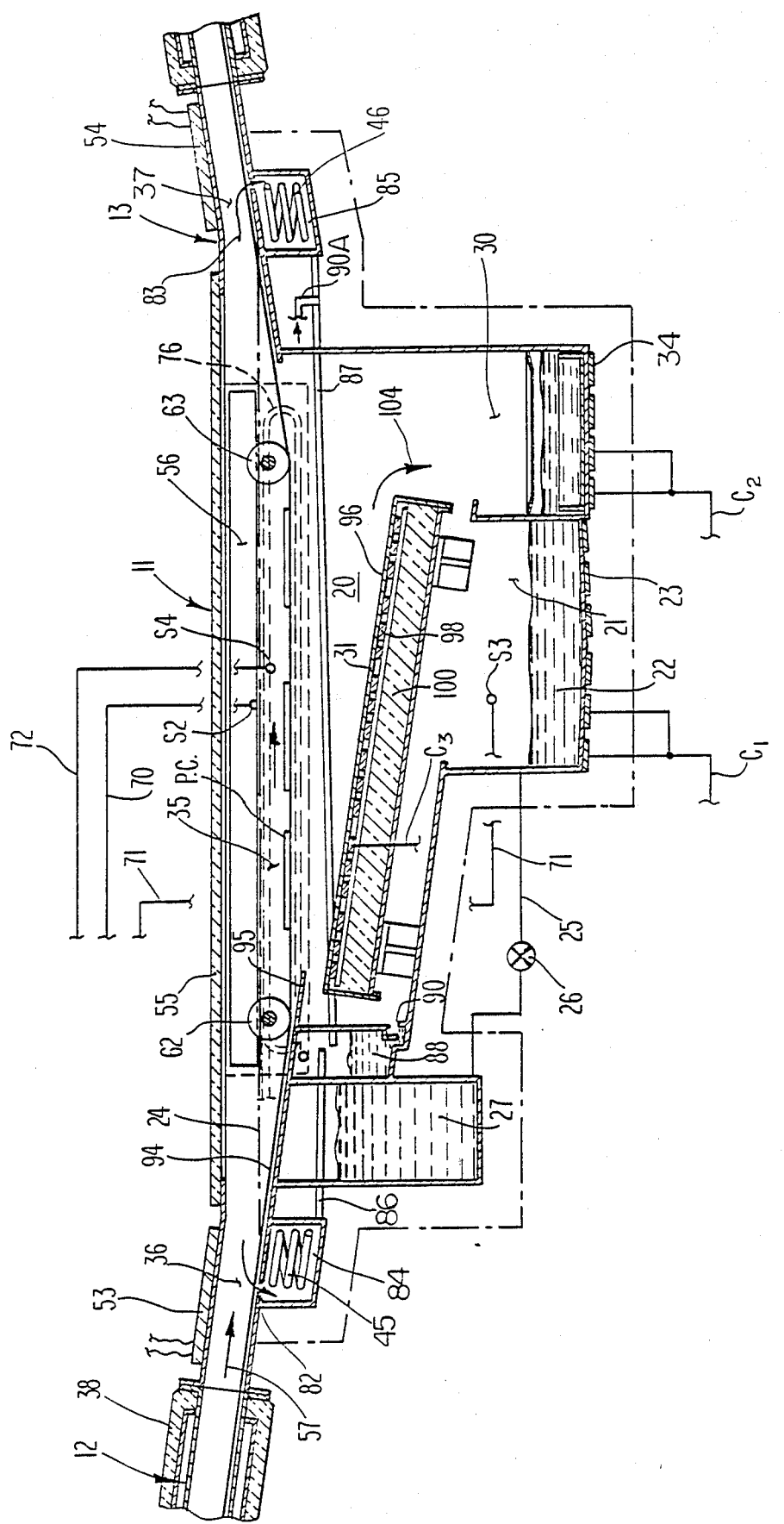
FIG. 3 is an enlarged fragmentary vertical longitudinal sectional view, taken through the processing chamber in accordance with this invention, with certain control and sensing features being schematically illustrated.

Referring now to the drawings in detail, reference is first made to FIG. 1, wherein the apparatus of this invention is generally designated by 10, and includes, inter alia, a processing chamber 11, inlet and outlet tunnels 12 and 13, respectively, through all of which runs a conveyor of an article conveying mechanism 14, with an article preheater 15 being disposed over an infeed section 16 of the conveyor. A control mechanism 17 of the computer type is also schematically illustrated.

With particular reference to FIG. 3, it will be noted that the processing apparatus 11 includes a processing chamber 20. A fluid boil tank 21 is provided with soldermelting fluid 22 therein at the lower end, with electric heating elements 23 also being provided for heating the fluid in the tank 21, to vaporize the same and fill the chamber 21 with solder-melting vapor, a predetermined upper vapor level 24 in the chamber. This will generally occur at a temperature of 419° F. to 420° F., but can vary depending upon the particular fluid that is used. A number of such fluids are commercially available on the market for meeting the desired parameters. The fluid 22, in its liquid phase, is delivered to the tank 21 via a fill line 25 with suitable valving 26, from a fluid fill or holding tank 27. The heaters 23 are controlled from the computer 17, via control line C1.

Within the processing chamber 20, there is also located a still chamber 30.

The still chamber 30 collects condensate and contaminants from the condensate flash tray 31 disposed upwardly thereof in the chamber 20 (and to be described in greater detail hereinafter), and upon fluid reaching a predetermined level therein, the computer 17, acting on level sensors (not shown) in the still chamber 30, will activate a plurality of still heaters 34 at the lower end of the still chamber, via heater control line C2, until a lower predetermined level is reached, at which point the heaters will automatically be deactivated. During operation, the still chamber 30 will cycle on and off automatically, as required. A discharge line 32 is provided for periodic discharge of denser or more concentrated contaminants, after they have been cooked down for a period of time, with the line 32 normally going to discharge.

Similarly, a discharge line 33 is provided from boil chamber 21, for filtration and return to chamber 27, if desired, or to discharge.

The inlet tunnel 12 is downwardly sloped, preferably at an angle of 5° to 10° relative to the horizontal, for delivery of articles therethrough on the conveying system 14, through the vapor zone 35, and upwardly through an exit tunnel 13, similarly oriented. The tunnels meet the processing chamber at interface zones 36 and 37.

Figure 5:
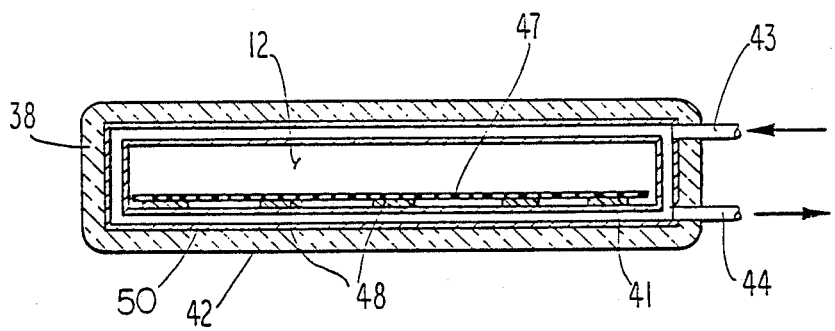
FIG. 5 is an enlarged transverse, generally vertical sectional view, taken through the inlet tunnel of this invention, generally along the line 5—5 of FIG. 1.

The tunnels 12 and 13 are provided with hot water jackets 38 and 40. These are mounted on the exterior on each tunnel, and comprise water conduits 41 surrounding the tunnel (see FIG. 5), and insulation 42 disposed in turn thereabout, with the inflow of water at 43 for heating the tunnel being provided from condensing coils 45,46 that have absorbed heat from the heat of condensation that occurs in connection with the collection of vapor condensate as will be described more fully hereinafter. With reference to FIG. 5, the water inlet and outlet lines 43,44 are illustrated, respectively. Also in FIG. 5, there is illustrated the conveyor belt 47 that passes through the top tunnels and processing chamber as part of the conveying system 14, sliding through the tunnels on suitable Teflon supports 48, mounted on a lower one 50 of four planar walls that comprise the tunnel 12. The entrance and exit tunnels 12 and 13, respectively, are thus heated by means of the hot water jackets, to a temperature of approximately 115° F., which temperature has been found to be effective in reducing fluid losses due to travel of vapor upwardly through the tunnels to their openings.

A pair of hot zones are provided at the vapor interfaces at about the tunnel-processing chamber interfaces 36 and 37, such hot zones principally being provided by means of electric heaters 53,54, mounted on the tops of the tunnels at their lower sloped ends thereof, most particulary as illustrated in FIG. 3, to raise the temperatures in the interface zones 36,37 to about 250° to 350° F. These hot zones heat the air/vapor to drive out water vapor that would otherwise be harmful to the soldering operation, and also reduce fluid "fogging", that may otherwise fog the glass or other transparent observation window 55 (due to possible aerosol presence in the vapor air zone 56 above the vapor level 24). The heaters 53,54 also serve to maintain the temperature of the air zone 56 within the range of approximately 200° F. to 350° F. In the case of the hot zone provided at the interface 36, as articles are delivered therethrough, in their left-to-right path of travel in the direction of arrow 57 of FIG. 3, the articles, preferably printed circuit boards and like, are further preheated, with the purpose of bringing the temperature of the wires and boards, or other elements that are to be soldered together, to about the same temperature, in order to effect good soldered connections.

The conveyor system 14 (see FIG. 1), in addition to including the conveyor 47, includes a suitable drive therefor (not shown), and will generally be of the endless belt type, from left-to-right, starting with an end roller 60, having an upper run 61, passing under re-orienting sprockets 62 and 63 at opposite ends of the processing chamber for changing the angled inlet and outlet direction of the path of conveyance of articles along the conveyor belt, and to maintain the path horizontal during the principal portion of the soldering operation in the zone 35. If desired, the sprockets, 62,63 connected in pairs by suitable shafts such as at 64, may comprise the drive means for the system. The conveyor belt at the discharge end 65 of the apparatus is provided with suitable take-up mechanisms 66, on the lower run thereof, and is returned via suitable rollers 67,68, in an endless manner.

It is in the vapor zone 35 that articles PC are principally subjected to the solder-melting fluid in its vapor phase, and the temperature will melt the solder and maintain the same in liquid form for a re-flow. The conveyor speed for effecting the desired time period of re-flow is likewise controlled by the computer 17. The maintenance of the vapor line 24 at the desired level is determined by the presence of a sensor S2 in the chamber 20, connected to the computer 17 via control line 70, to prevent vapor collapse, which might otherwise occur, if careful control of the amount of heat being provided in the chamber 20 falls below that necessary to maintain the desired vapor level 24. Thus, the computer 17 automatically controls the same. Similarly, a sensor S3 in a chamber 21 senses the temperature for maintaining the level 24, with the sensor S3 being connected via control line 71 to the computer 17. Another sensor S4 disposed above the vapor zone 35, senses the temperature at that location, and is connected via control line 72, also to the computer, whereby precise control of conditions for maintaining the vapor temperature and its level are available to the computer.

As aforesaid, condenser conduits are provided for controlling the condensation of solder-melting fluid vapor and for controlling the heat in the vapor zones, such that the heat of condensation imparts heat to water that is being conveyed through the condensor coils or other conduits. In order that any condensation of the vapor not take place sporadically, or at random throughout the system, and perhaps condense on the article to be soldered, thereby causing potential soldering problems, the placement of the condenser conduits is important such that any fluid condensate may be captured in controlled locations and delivered to any appropriate location in the chamber 20 for re-vaporization.

Figure 4:
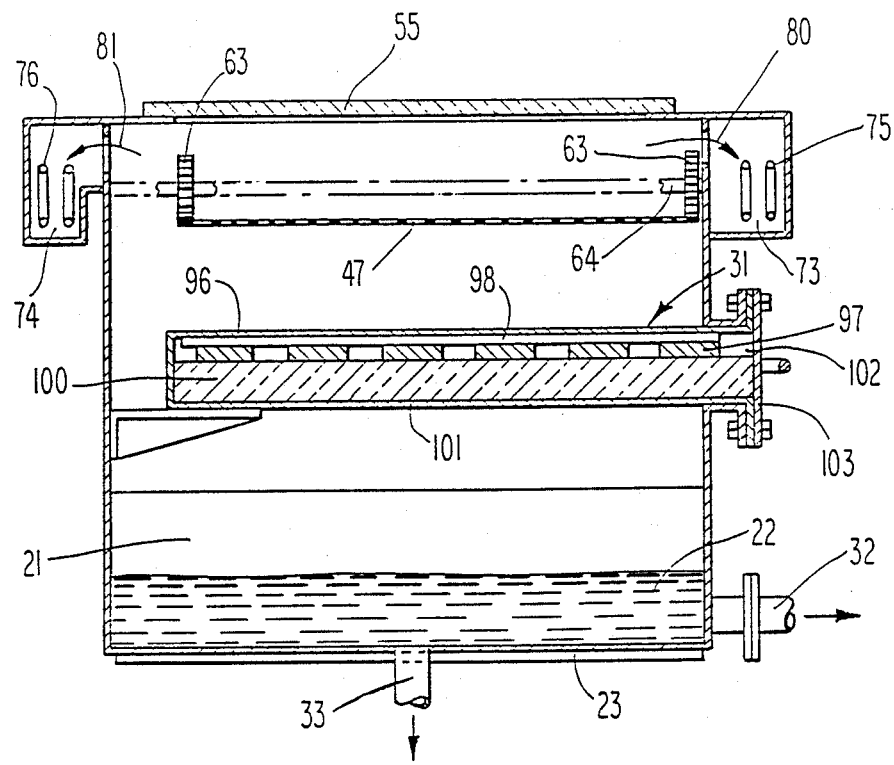
FIG. 4 is an enlarged transverse vertical sectional view, taken through the processing chamber of this invention, generally along the line 4—4 of FIG. 1.

Condensate retention zones or receptacles 73,74 (see FIG. 4) exist at the front and back of the apparatus, for collection of condensate therein. Significant amounts of the the condensate is caused to condense at those locations, due to the presence of relatively cooler water filled coils, or condensing coils 75,76 located therein.

The coils 75,76 are fed via a suitable water inlet 77 (see FIG. 2), whereby water at a temperature of about 80° F. to 85° F. delivered from a suitable coolant tank (not shown) through suitable valving filtration, etc. (also not shown), is delivered for providing cooler zones relative to the temperature of the vapor zone, for condensing of fluid vapors in the retention zones 73,74, located for controlling the locations of formation of such condensate. The condensing coils 75 and 76 are interconnected via line 78, and water from those coils is delivered to the condensing coils 45 and 46 at a temperature of about 120° F. to 130° F. The coils 45 and 46 are located below the conveyor belt to prevent condensate from dripping onto printed circuits or other products being conveyed thereabove. The vapor flow is thus in the direction of the arrows 80,81, as it is condensed, at the front and back of the apparatus (FIG. 4), and is in the direction of the arrows 82,83, as it passes over condensing coils 45,46, respectively, in the latter case, into collection zones or receptacles 84,85 respectively, again for collection beneath the path of movement of the conveyor, to prevent condensate from falling on articles being conveyed thereabove. The condensate is then delivered from receptacles 84 and 85, via delivery lines 86 and 87, to an acid strip tray or chamber 88, where soda/lime is added to it for removing acid, with the outlet from the chamber 88 at conduit location 90, sufficing to deliver the condensate back to the boil chamber 21 for re-use. Similarly, condensate collected in receptacles or collection zones 73,74 is delivered to the chamber 21, via suitable lines 90A connected into one or more of condensate returned lines 86 or 87, for likewise delivery to the acid tray 88 as aforesaid.

It will be noted that conduit lines 91,92 connect water from the condenser coils 45,46 respectively, for delivery to the tunnel water jackets, such as that 38 illustrated in FIG. 5, for delivery of water to the tunnels at temperatures that have been elevated due to the presence of condenser coils near or in heatproviding zones, such that the water in the condenser lines at this point provides heat for heating the tunnels 12,13 as described.

With particular reference now to FIG. 3, it will be seen that the condensate flash tray device 31, is disposed to receive any condensate falling from the vapor zone 35 immediately thereabove, and also to receive any condensate delivered from the zone 36, over sloped plate 94, downwardly over its lip 95, onto the upper surface 96 of the flash tray. Electric heaters 97 are provided inside the tray, for heating a plate 98 and consequently the upper surface 96 of the tray, and insulation 100 (see FIG. 4) is provided for directing the heat from the heaters upwardly. The heaters and the tray are in a front-opening C-shaped container 101 having an access opening 102 by removal of a suitable access plate 103, for servicing the tray, for replacement of heaters, etc.

The heated tray, during production, will produce about two-thirds of the heat energy required to return the condensate back to a vapor state. The other one-third of the condensate will rinse the sloped tray down, in the direction of the arrow 104, into the still chamber 30, as illustrated in FIG. 3, for removal of particulates, rosin and fluxes, which are carried by condensate droplets. In the still chamber 30, the condensate will be re-vaporized, allowing the collection of particulates, rosin and fluxes via discharge line 32, as aforesaid. The condensate flash tray 31 facilitates the maintainence of a strong, constant vapor blanket in zone 35. The immediate availability of the heat provided for flashing condensate falling onto the flash tray 31, for immediately revaporizing such condensate, prevents vapor collapse that could otherwise occur due to the loss of heat, such as for example, by the continuously incoming cooler product and conveyor belt, along with any air brought along with it into the system. The heaters 97 may likewise be controlled by the computer, for varying the amount of heat applied therethrough, as needed, based upon sensors such as S2 and S4, discussed above, on an automatic basis with control from the computer 17 being provided via control line C3.

Figure 7:
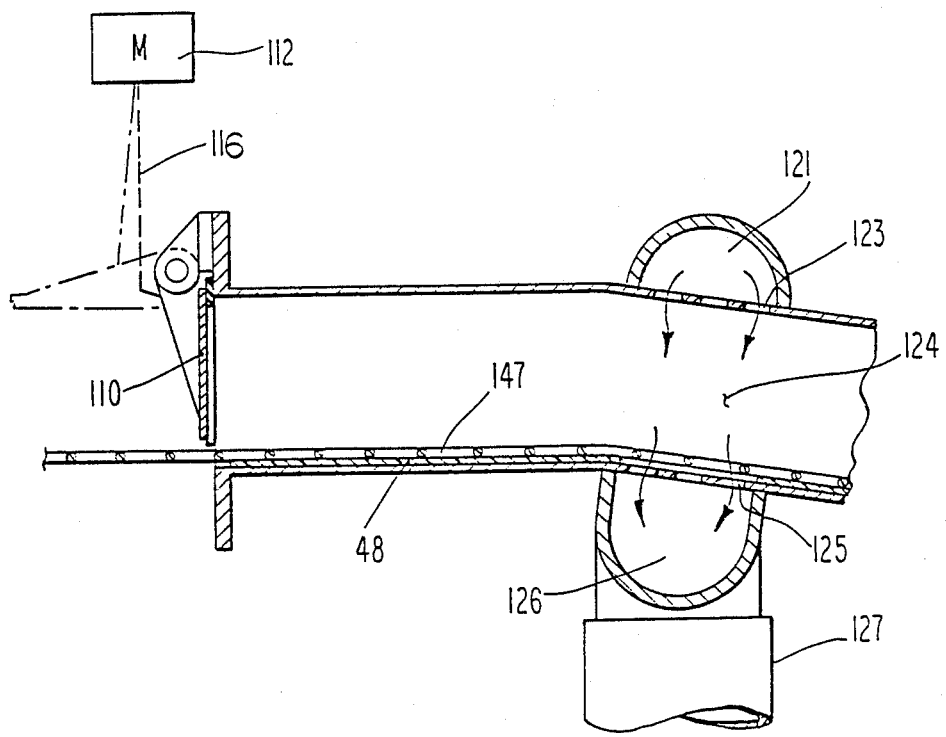
FIG. 7 is an enlarged, fragmentary longitudinal vertical sectional view, taken through the apparatus of this invention, generally along the line 7—7 of FIG. 6, and wherein the air shield ducts and openable closure for the entrance tunnel are more clearly illustrated.

With particular reference to FIGS. 1, 2 and 7, it will be noted that openable closures or doors 110 and 111 are provided at entrance and exit ends of respective entrance and exit tunnels 12 and 13. The doors operate similarly, so only one need be discussed in detail. With reference to FIG. 7, it is seen that door 110 is pivotally movable from the full line closed position thereof illustrated in FIG. 7, to the phantom line position shown in which it is pivoted open. The doors are controlled via suitable control lines 110A, by motors 112, also suitably connected via lines 113 to the computer 17, with the actual control mechanism being of any suitable type. A sensor 114, at the load end of the machine illustrated in FIG. 1, senses the presence of printed circuit boards or other articles to be processed, and actuates the computer 17, for operation of the motors 112, for opening of the doors 110 and 111. The doors will remain open as long as additional articles are being presented to the load station of the machine. After a period of time has elapsed and no boards have appeared, the doors will automatically close, sealing the inlet and outlet, such period of time having been measured by a suitable timer such as 115 illustrated at the left side of FIG. 1. Also, if the appropriate vapor level 24 is not met as determined by the sensor S2, or if the appropriate temperature is not met, for example as determined by the sensor S2, the computer 17 can keep the doors 110 and 111 from opening, until such parameters are met as will allow the opening of the doors to permit entry of additional product into the system.

Figure 6:
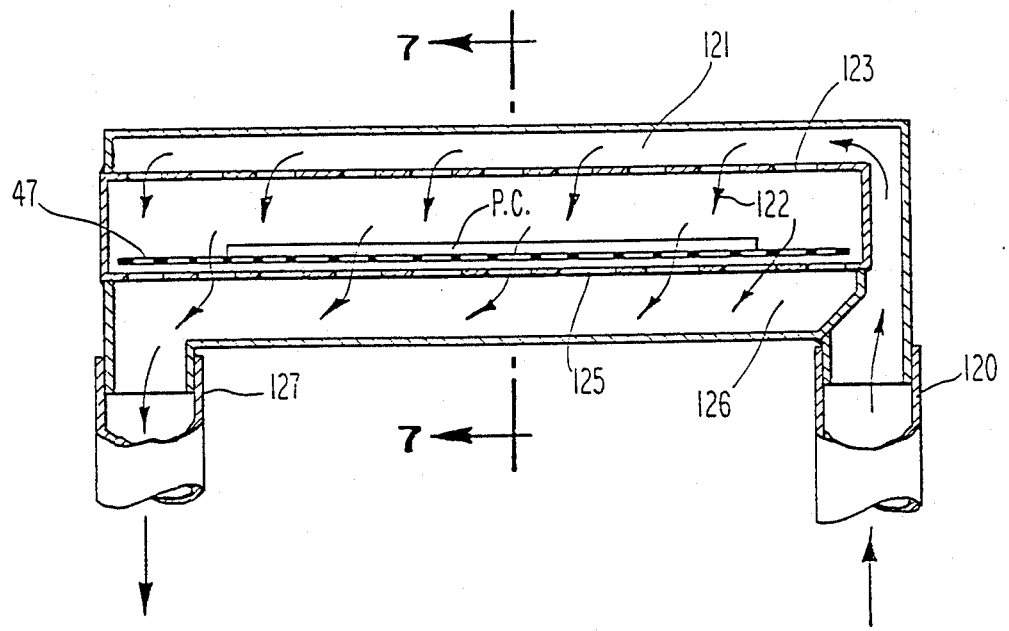
FIG. 6 is an enlarged, fragmentary transverse generally vertical sectional view, taken through the air shield ducts of this invention, generally along the line 6—6 of FIG. 1.

In order to minimize losses of solder-melting vapor, through the open inlet closure 110, or out the open exit closure 111, which losses could occur from some entrapment of vapor on components of the printed circuit boards or other elements, the inlet and outlet openings of the tunnel are provided with a recirculating closed or partially closed loop which discharges air across the tunnels at those locations, just inside the closure doors, for effecting an air shield for inhibiting the passage of vapor therethrough. Accordingly, with reference to FIG. 6, it will be seen that air is delivered from line 120 to a zone 121 at the top of the tunnel, to pass downwardly in the direction of arrows 122 through openings 123 in the upper wall of the tunnel, forming an air shield at 124, as such delivered air is drawn through openings 125 in the lower wall of the tunnel, into a zone 126, to a return duct 127 or 128, whereby it is delivered to a demister 130. Air in the demister has vapor or aerosol components removed therefrom, and may partially then be exhausted to atmosphere, or not, as desired, but will generally be at least substantially returned as part of a recirculating system. To this end, an air pump 131 will return the air via suitable return ducts 132, for re-use. The demister will preferably be an electrostatic precipitator, which functions in a conventional manner, to cause particles to be driven to a collection plate therein by means of passing through an electric field which imparts charges onto the particles, such that the particles can then be collected for delivery via suitable demister discharge line 133, on a continuous or periodic basis as determined by operation of a valve 134, into a still zone 30.

Articles to be processed in the system of this invention are preferably preheated by means of the preheater 15, as the first increase in temperature of the articles. However, the preheater is not essential in that the other preheating apparatus, such as the heated inlet tunnel and hot plate 53 that provides the hot zone 36 can provide preheating, as desired, if need be. Additionally, product exiting the apparatus at conveyor location 65 may be cooled down by means of suitable fans or blowers (not shown), if desired. It will be apparent that the re-flow process may be observed through the window 55, to assure correct operation of the apparatus by an operator. It will also be apparent that any number of variations are possible for the operation of this apparatus, and for accomplishing the above method, within the scope of the disclosure and claims presented here. For example, numerous details of valving and conduit lines have been ommitted, as have been numerous control features, in the interest of clarity. It will also be apparent that other articles than those specifically mentioned herein may be used in accordance with this system. It will further be apparent that other details of the system have been ommitted, such the means for cooling water for the condenser coils, in that any conventional means may suffice. Likewise, filtration of various fluids will normally be made, in accordance with accepted good practice in the trade. The system will be preferably be completely automatically operated from the computer, in a most efficient manner. For example, but not intended to be limiting, the computer will direct reductions in temperature provided through the various heaters for heating the fluid, with increasingly extended passages of time from delivering of articles to be treated. Other modifications to the method and apparatus will be readily apparent to those skilled in the art, all within the spirit and scope of the objects and the claimed invention.

What is claimed is:

1. A vapor phase soldering apparatus comprising a processing chamber, including means associated with the processing chamber for heating a solder-melting fluid therein to a predetermined solder-melting vapor phase temperature in a vapor zone at an upper portion of the chamber, entrance and exit tunnels communicating with the vapor zone of the chamber, and conveyor means extending through said tunnels and vapor zone of said processing chamber from a location ahead of the inlet to said entrance tunnel to a location beyond the outlet of said exit tunnel for conveying articles to be soldered therethrough, the improvement comprising openable closures for sealing the inlet and outlet of said entrance and exit tunnels respectively, against discharge of vapor therethrough.

2. The apparatus of claim 1, including control means operatively connected to said closures, for opening and closing said closures.

3. The apparatus of claim 2, wherein said control means is of the automatically operative type for controlling the operation of at least one of said closures in response to at least one predetermined parameter.

4. The apparatus of claim 2, including article sensing means disposed at said conveyor means at a location ahead of the inlet to said entrance tunnel, for sensing the presence of an article about to enter said entrance tunnel, and operatively connected to said control means.

5. A vapor phase soldering apparatus comprising a processing chamber, including means associated with the processing chamber for heating a solder-melting fluid therein to a predetermined solder-melting vapor phase temperature in a vapor zone at an upper portion of the chamber, entrance and exit tunnels communicating with the vapor zone of the chamber, and conveyor means extending through said tunnels and vapor zone of said processing chamber from a location ahead of the inlet to said entrance tunnel to a location beyond the outlet of said exit tunnel for conveying articles to be soldered therethrough, the improvement comprising:
   openable closures for sealing the inlet and outlet of said entrance and exit tunnels, respectively, against discharge of vapor therethrough,
   control means operatively connected to said closures for opening and closing said closures, and heat sensing means disposed for sensing the heat in the processing chamber and operatively connected to said control means.

6. A vapor phase soldering apparatus comprising a processing chamber, including means associated with the processing chamber for heating a solder-melting fluid therein to a predetermined solder-melting vapor phase temperature in a vapor zone at an upper portion of the chamber, entrance and exit tunnels communicating with the vapor zone of the chamber, and conveyor means extending through said tunnels and vapor zone of said processing chamber from a location ahead of the inlet to said entrance tunnel to a location beyond the outlet of said exit tunnel for conveying articles to be soldered therethrough, the improvement comprising:
   openable closures for sealing the inlet and outlet of said entrance and exit tunnels, respectively, against discharge of vapor therethrough,
   control means operatively connected to said closures for opening and closing said closures, and vapor level sensing means disposed for sensing the vapor level in the vapor zone and operatively connected to said control means.

7. A vapor phase soldering apparatus comprising a processing chamber, including means associated with the processing chamber for heating a solder-melting fluid therein to a predetermined solder-melting vapor phase temperature in a vapor zone at an upper portion of the chamber, entrance and exit tunnels communicating with the vapor zone of the chamber, and conveyor means extending through said tunnels and vapor zone of said processing chamber from a location ahead of the inlet to said entrance tunnel to a location beyond the outlet of said exit tunnel for conveying articles to be soldered therethrough, the improvement comprising:
   openable closures for sealing the inlet and outlet of said entrance and exit tunnels, respectively, against discharge of vapor therethrough,
   control means operatively connected to said closures for opening and closing said closures, and article sensing means disposed at said conveyor means at a location ahead of the inlet to said entrance tunnel, for sensing the presence of an article about to enter said entrance tunnel, and operatively connected to said control means, including heat sensing means disposed for sensing the heat in the processing chamber, and operatively connected to said control means, and including vapor level sensing means disposed for sensing the vapor level in the vapor zone, and operatively connected to said control means.

8. The apparatus of claim 4, including timing means operatively associated with said article sensing means and said control means, for automatically closing said closure means when a predetermined period of time has elapsed after detection of articles by said article sensing means.

9. A vapor phase soldering apparatus comprising a processing chamber, including means associated with the processing chamber for heating a solder-melting fluid therein to a predetermined solder-melting vapor phase temperature in a vapor zone at an upper portion of the chamber, entrance and exit tunnels downwardly sloped toward said processing chamber and communicating with the vapor zone of the chamber, and conveyor means extending through said tunnels and vapor zone of said processing chamber for defining a path for conveying articles to be soldered into, through and out of the vapor zone, with said tunnels being provided with tunnel heating means, and said tunnel heating means comprising means inhibiting vapor fluid loss.

10. The apparatus of claim 9, wherein said tunnel heating means comprises water-jacket-type heating means disposed on the exterior of the tunnel.

11. A vapor phase soldering apparatus comprising a processing chamber, including means associated with the processing chamber for heating a solder-melting fluid therein to a predetermined solder-melting vapor phase temperature in a vapor zone at an upper portion of the chamber, entrance and exit tunnels communicating with the vapor zone of the chamber, and conveyor means extending through said tunnels and vapor zone of said processing chamber for defining a path for conveying articles to be soldered therethrough, including heating means within at least one of said tunnels for creating a hot zone proximate the interface between said one of said tunnels and the processing chamber.

12. The apparatus of claim 11, wherein said heating means comprises means for raising the temperature of the hot zone within a range of about 250° F. to about 350°.

13. The apparatus of claim 22, wherein said heating means comprises means for reducing the humidity at the said interface.

14. The apparatus of claim 11, wherein the hot zone is at least at the entrance tunnel and the heating means comprises means for preheating articles being delivered to the processing chamber.

15. A vapor phase-soldering apparatus comprising a processing chamber, including means associated with the processing chamber for heating a solder-melting fluid therein to a predetermined solder-melting vapor phase temperature in a vapor zone at an upper portion of the chamber, entrance and exit tunnels communicating with the vapor zone of the chamber, and conveyor means extending through said tunnels and vapor zone of said processing chamber for defining a path for conveying articles to be soldered therethrough, including means comprising a hot zone located at about the interfaces of the entrance and exit tunnels and processing chamber, and which means comprises means for maintaining a hot air zone above the vapor level in the processing chamber.

16. The apparatus of claim 13, including condensing means disposed in said hot zone, and means for cooling said condensing means for condensation of vapor thereon.

17. The apparatus of claim 16, wherein the condensing means is located below the path of movement of articles being conveyed, whereby vapor being condensed is condensed at a level below where dripping would occur onto articles being conveyed.

18. A vapor phase soldering apparatus comprising a processing chamber, including means associated with the processing chamber for heating a solder-melting fluid therein to a predetermined solder-melting vapor phase temperature in a vapor zone at an upper portion of the chamber, entrance and exit tunnels communicating with the vapor zone of the chamber, and conveyor means extending through said tunnels and vapor zone of said processing chamber for defining a path for conveying articles to be soldered therethrough, including heating means for maintaining a hot zone of hot air above the vapor level in the processing chamber.

19. A vapor phase soldering apparatus comprising a processing chamber, including means asociated with the processing chamber for heating a solder-melting fluid therein to a predetermined solder-melting vapor phase temperature in a vapor zone at an upper portion of the chamber, entrance and exit means communicating with said vapor zone for delivery of articles to be soldered therethrough, and conveying means for conveying articles along a path through the vapor zone, including means located in the vapor zone for automatically rapidly revaporizing vapor condensate in the vapor zone, for facilitating the maintenance of a predetermined vapor level.

20. The apparatus of claim 19, wherein said means for revaporizing includes a flash tray disposed in said vapor zone below said conveying means, and means for heating the flash tray.

21. The apparatus of claim 20, wherein the means for heating the flash tray comprises electrically operated heating elements disposed in the vapor zone against an undersurface of the flash tray to maintain an upper surface of the flash tray at a temperature sufficient for rapid revaporizing of the condensate of the solder-melting fluid.

22. The apparatus of claim 19, including means facilitating controlled condensing of vapor at predetermined locations and means for delivering condensate from said locations to said revaporizing means.

23. The apparatus of claim 22, wherein said means for revaporizing includes a flash tray disposed in said vapor zone below said conveying means, and means for heating the flash tray.

24. The apparatus of claim 23, wherein said means facilitating controlled condensing of vapor includes liquid-containing condenser conduits and condensate receptacles disposed at said entrance and exit means, located below the path of movement of articles being conveyed, whereby vapor being condensed is condensed at a level below where dripping would occur onto articles being conveyed.

25. The apparatus of claim 23, wherein said means facilitating controlled condensing of vapors include condenser conduits and conduit receptacles at opposite sides of said vapor zone.

26. The apparatus of claim 23, wherein said means facilitating controlled condensing of vapor includes liquid-containing condenser conduits and condensate receptacles disposed at said entrance and exit means, located below the path of movement of articles being conveyed, whereby vapor being condensed is condensed at a level below where dripping would occur onto articles being conveyed, wherein said means facilitating controlled condensing of vapors include condenser conduits and conduit receptacles at opposite sides of said vapor zone, and wherein the means for heating the flash tray comprises electrically operated heating elements disposed against an undersurface of the flash tray to maintain an upper surface of the flash tray at a vaporizing temperature of the solder-melting fluid.

27. A vapor phase soldering apparatus comprising a processing chamber, including means associated with the processing chamber for heating a solder-melting fluid therein to a predetermined solder-melting vapor phase temperature in a vapor zone at an upper portion of the chamber, entrance and exit means communicating with said vapor zone for delivery of articles to be soldered therethrough, conveying means for conveying articles along a path through the vapor zone, a flash tray disposed in said vapor zone below said conveying means for facilitating the maintenance of a predetermined vapor level, means for heating said flash tray, means facilitating controlled condensing of vapor at predetermined locations and means for delivering condensate from said locations to the flash tray, wherein said flash tray is disposed in sloped orientation in the chamber above a solder-melting fluid retention zone, and wherein said means for delivering condensate includes means for washing the flash tray with condensate, at least partially into said retention zone.

28. A vapor phase soldering apparatus comprising a processing chamber, including means associated with the processing chamber for heating a solder-melting fluid therein to a predetermined solder-melting vapor phase temperature in a vapor zone which has a predetermined upper limit at an upper portion of the chamber, entrance and exit tunnels communicating with the vapor zone of the chamber from above said upper limit, and conveyor means extending through said tunnels and vapor zone of said processing chamber for defining a path for conveying articles to be soldered therethrough, with said entrance and exit tunnels having respective inlet and outlet openings for air shield means across said inlet and outlet openings for shielding said openings against passage of significant amounts of vapor therethrough.

29. The apparatus of claim 28, wherein said air shield means includes an at least partially recirculating loop means for delivering air across said inlet and outlet openings.

30. The apparatus of claim 29, including means for removing vapor and/or aerosols from air delivered across said inlet and outlet openings.

31. The apparatus of claim 29, wherein said means for delivering air includes ducts for providing an returning air to and from said inlet and outlet openings.

32. The apparatus of claim 30, wherein said means for removing vapor comprises an electrostatic precipitator.

33. The apparatus of claim 32, wherein said air shield means includes an at least partially recirculating loop means for delivering air across said inlet and outlet openings.

34. The apparatus of claim 32, wherein conduit means are provided for return of removed vapor components from the electrostatic precipitator to said means for heating a solder-melting fluid.

* * * * *